United States Patent
Noh et al.

(10) Patent No.: US 11,611,085 B2
(45) Date of Patent: Mar. 21, 2023

(54) MULTIPLE PERFORATION PLATE FOR SEPARATOR OF FUEL CELL

(71) Applicants: Hyundai Motor Company, Seoul (KR); Kia Motors Corporation, Seoul (KR)

(72) Inventors: Seung Tak Noh, Suwon-si (KR); Ji Han Lee, Seongnam-si (KR); Jae Man Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 192 days.

(21) Appl. No.: 17/099,332

(22) Filed: Nov. 16, 2020

(65) Prior Publication Data

US 2022/0021008 A1   Jan. 20, 2022

(30) Foreign Application Priority Data

Jul. 16, 2020   (KR) .................. 10-2020-0088426

(51) Int. Cl.
| | |
|---|---|
| *H01M 8/0258* | (2016.01) |
| *H01M 4/88* | (2006.01) |
| *H01M 8/1007* | (2016.01) |
| *H01M 8/1004* | (2016.01) |

(52) U.S. Cl.
CPC ....... *H01M 8/0258* (2013.01); *H01M 4/8807* (2013.01); *H01M 8/1004* (2013.01); *H01M 8/1007* (2016.02)

(58) Field of Classification Search
CPC ............. H01M 4/8807; H01M 8/0232; H01M 8/0247; H01M 8/0258; H01M 8/1004; H01M 8/1007; Y02E 60/50
See application file for complete search history.

(56) References Cited

U.S. PATENT DOCUMENTS

2005/0244689 A1   11/2005   Horiguchi et al.

FOREIGN PATENT DOCUMENTS

| KR | 20060047536 A | 5/2006 |
|---|---|---|
| KR | 100843873 B1 | 7/2008 |

*Primary Examiner* — Victoria H Lynch
(74) *Attorney, Agent, or Firm* — Slater Matsil, LLP

(57) ABSTRACT

A multiple perforation plate for a separator of a fuel cell is provided. The multiple perforation plate is disposed between the separator having a flat plate shape and a gas diffusion layer to form flow paths for a reaction gas, and the multiple perforation plate includes a porous hole region having an uneven shape repeatedly formed therein and provided with a plurality of flow path holes configured to allow the reaction gas to flow in a turbulent way, and a channel region forming a flow path configured to allow the reaction gas to flow along a flow direction of the reaction gas in a straight way, wherein the porous hole region and the channel region are alternately disposed and integrally formed.

20 Claims, 7 Drawing Sheets

- PRIOR ART -

MULTIPLE PERFORATION PLATE FOR SEPARATOR OF FUEL CELL

CROSS-REFERENCE TO RELATED APPLICATIONS

This application claims the benefit of Korean Patent Application No. 10-2020-0088426, filed Jul. 16, 2020, which application is hereby incorporated herein by reference.

TECHNICAL FIELD

The present invention relates to a multiple perforation plate for a separator of a fuel cell.

BACKGROUND

A fuel cell is a type of device generating power, which converts chemical energy contained in fuel into electrical energy by reacting electrochemically within a stack. The fuel cell not only supplies driving power for use in industries, households, and vehicles, but also supplies power to small electronic products such as portable devices. Therefore, the fuel cell may be used as a high-efficiency clean energy source, and its use area is gradually expanding.

A unit cell constituting the fuel cell includes an electrolyte membrane, electrodes (i.e., an anode and a cathode), gas diffusion layers (GDLs), and separators. In addition, these unit cells are stacked to form a fuel cell stack.

Meanwhile, in recent years, as a gas diffusion layer and a separator come into direct contact with each other, a multiple perforation plate having a microporous structure is interposed between the gas diffusion layer and the separator in order to improve the diffusion ability of a reaction gas, while preventing the gas diffusion layer from being locally damaged by an uneven pattern of the separator.

The multiple perforation plate is used in this way, so that surface pressure applied to the gas diffusion layer is made uniform, and turbulent flow of the reaction gas is induced, whereby the gas diffusion layer is protected and the flow of the reaction gas and cooling water is evenly distributed throughout the entire reaction region.

FIG. 1 is a schematic diagram showing a configuration of a general unit cell for a fuel cell to which a conventional multiple perforation plate is applied.

As shown in FIG. 1, the conventional unit cell for the fuel cell to which the multiple perforation plate is applied includes a membrane electrode assembly (MEA) 10 including an electrolyte membrane ii and a pair of electrodes 12a and 12b, gas diffusion layers (GDLs) 20 disposed on opposite sides of the membrane electrode assembly 10, a separator 31 disposed outside the gas diffusion layer 20, and a multiple perforation plate 32 interposed between the gas diffusion layer 20 and the separator 31. Typically, the separator 31 and the multiple perforation plate 32 are used together to form a porous separator 30, and in the unit cell for the conventional fuel cell, such a porous separator 30 serves as a separator in which a flow path having a straight shape is formed.

At this time, the separator 31 may be configured as various forms, but is preferably made of a flat plate having a planar shape.

Meanwhile, the multiple perforation plate 32 is formed by processing a plate-shaped material provided with a plurality of flow path holes formed therein, and is formed by repeatedly forming waveform cross sections along a flow direction of the reaction gas, thereby being configured as an uneven shape.

Therefore, when the reaction gas flows through the multiple perforation plate 32, the reaction gas flows in a turbulent way while passing through a number of flow path holes in a zigzag manner, and flows in the direction from one side of the multiple perforation plate 32 to the other side thereof as a whole.

Meanwhile, as fuel cells are applied to various platforms, there is a need to improve power density of fuel cells.

Since an interval between cells must be reduced in order to improve the power density, thinning of components constituting the cells is essential.

However, in a thinned cell, an effective cross-sectional area of the flow path through which the supplied reaction gas flows is reduced, thereby causing a problem in that the discharge ability of generated water is lowered.

In particular, in the case of the unit cell including the multiple perforation plate 32, since the reaction gas is diffused by forced convection in a turbulent way, the generated water is not discharged smoothly compared to the discharge of the flow path having a straight shape, whereby there also occurs a problem in that the cell voltage is decreased as the reaction gas is not supplied smoothly due to the generated water being stagnated.

The foregoing is intended merely to aid in the understanding of the background of the present invention, and is not intended to mean that the present invention falls within the purview of the related art that is already known to those skilled in the art.

SUMMARY

The present invention relates to a multiple perforation plate for a separator of a fuel cell. Particular embodiments relate to a multiple perforation plate for a separator of a fuel cell capable of improving the discharge ability of generated water while maintaining excellent gas diffusion ability.

According to an exemplary embodiment of the present invention, a multiple perforation plate for a separator of a fuel cell is disposed between the separator having a flat plate shape and a gas diffusion layer to form flow paths for a reaction gas, and the multiple perforation plate includes a porous hole region having an uneven shape repeatedly formed therein and being provided with a plurality of flow path holes so as to allow the reaction gas to flow in a turbulent way, and a channel region forming a flow path so as to allow the reaction gas to flow along a flow direction of the reaction gas in a straight way, wherein the porous hole region and the channel region are alternately disposed, and integrally formed.

The reaction gas may flow reciprocally between the porous hole region and the channel region.

The channel region may include a pair of side surface parts and a contact surface part formed between the pair of side surface parts to contact the gas diffusion layer, and the channel region may be open in a direction of the separator.

Each of the side surface parts may be provided with a plurality of first communication holes communicating with the porous hole region.

The contact surface part may be provided with a plurality of second communication holes communicating with the gas diffusion layer.

The contact surface part may be configured to be flat to make surface contact with the gas diffusion layer.

The porous hole region may be formed by processing a plate-shaped material provided with the plurality of flow path holes formed therein, and may be formed by repeatedly forming waveform cross sections along the flow direction of the reaction gas to form the uneven shape.

According to an exemplary embodiment of the present invention, in a multiple perforation plate providing flow paths through which the reaction gas and the generated water flow, a porous hole region for inducing a flow of reaction gas and generated water in a turbulent way and a channel region for inducing a flow of reaction gas and generated water in a straight way are alternately formed, thereby improving the discharge ability of the generated water while at the same time maintaining excellent gas diffusion ability.

In addition, as the channel region having a straight shape compared to that of the general porous structure is formed, the pressure difference between an inlet and an outlet for the reaction gas may be improved.

In addition, as communication holes through which the reaction gas and the generated water flow are formed between the channel region and the porous hole region, supply of the reaction gas and discharge of the generated water may be smoothly performed.

In addition, compared to a general multiple perforation plate structure, a flat part is secured in the channel region, so that damage to the gas diffusion layer due to direct contact during lamination may be suppressed.

In particular, since the contact area between the multiple perforation plate and the gas diffusion layer is secured as a wide surface, it is possible to expect an effect of improving distribution of fastening force in a stack and reducing contact resistance.

DETAILED DESCRIPTION OF ILLUSTRATIVE EMBODIMENTS

Figure 1:
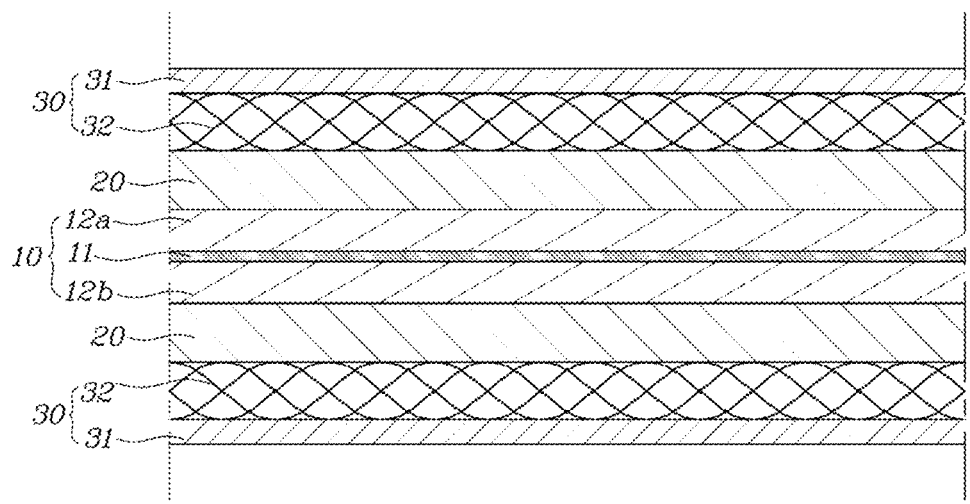
FIG. 1 is a schematic diagram showing a configuration of a general unit cell for a fuel cell to which a conventional multiple perforation plate is applied.

Hereinafter, exemplary embodiments of the present invention will be described in more detail with reference to the accompanying drawings. However, the present invention is not limited to the exemplary embodiments disclosed below, but may be implemented in various forms different from each other. Rather, these exemplary embodiments are provided so that this disclosure will be thorough and complete and will fully convey the concept of the invention to those skilled in the art. In the diagrams, the same reference numerals refer to the same components.

Figure 2:
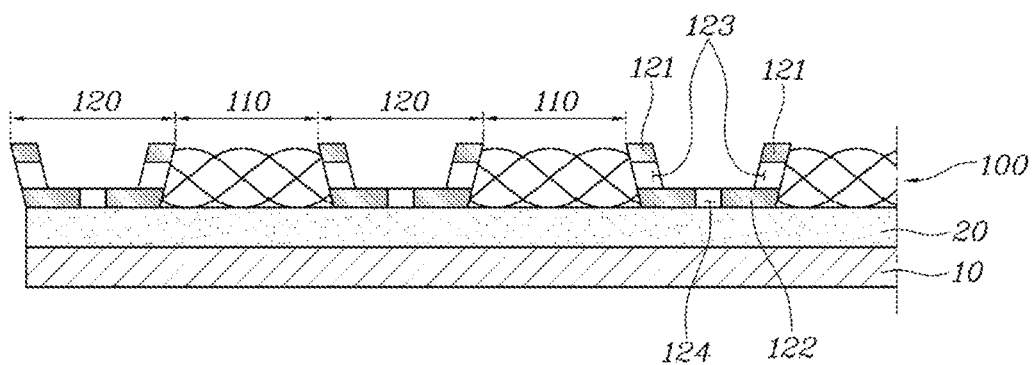
FIG. 2 is a schematic cross sectional diagram showing a multiple perforation plate for a separator of a fuel cell according to an exemplary embodiment of the present invention.
Figure 3:
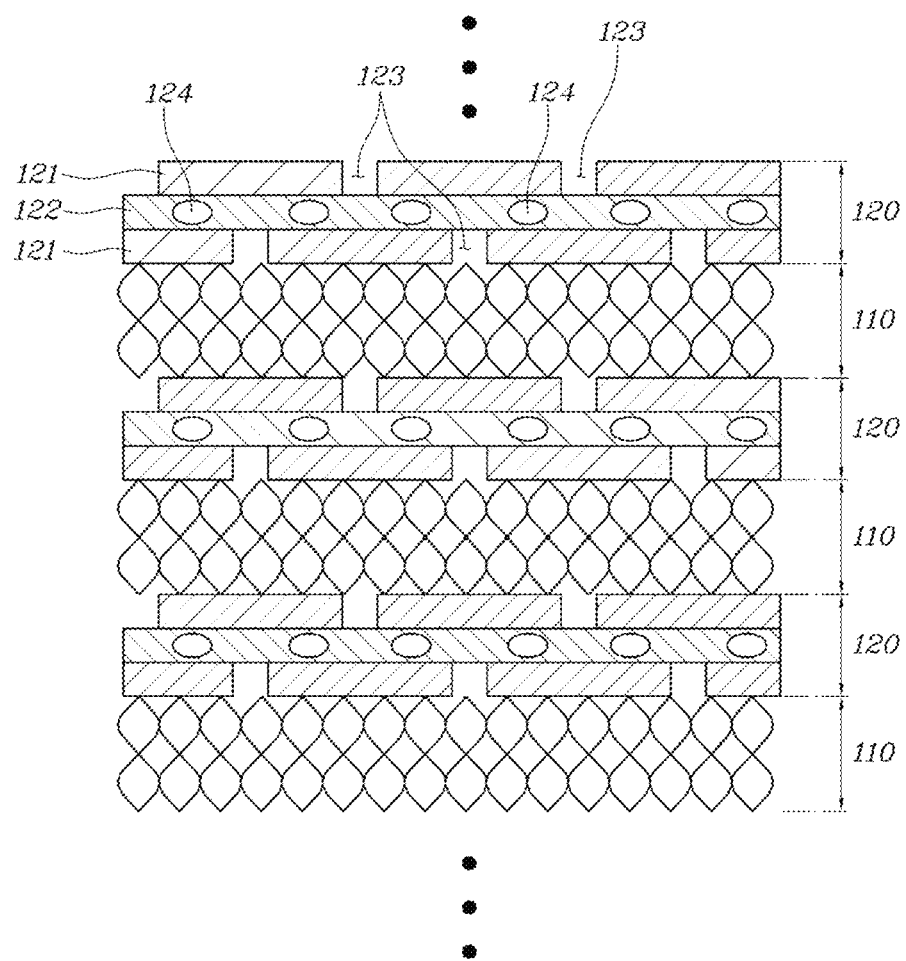
FIG. 3 is a schematic plan diagram showing the multiple perforation plate for the separator of the fuel cell according to an exemplary embodiment of the present invention.
Figure 4:
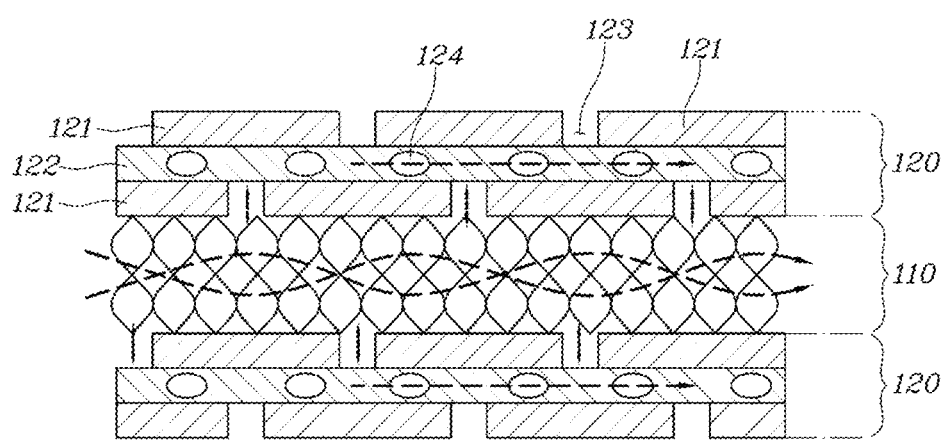
FIG. 4 is a schematic diagram showing a flow direction of a reaction gas in the multiple perforation plate for the separator of the fuel cell according to an exemplary embodiment of the present invention.

FIG. 2 is a schematic cross sectional diagram showing a multiple perforation plate for a separator of a fuel cell according to an exemplary embodiment of the present invention, FIG. 3 is a schematic plan diagram showing the multiple perforation plate for the separator of the fuel cell according to an exemplary embodiment of the present invention, and FIG. 4 is a schematic diagram showing a flow direction of a reaction gas in the multiple perforation plate for the separator of the fuel cell according to an exemplary embodiment of the present invention.

As shown in the drawing, a multiple perforation plate 100 for a separator of a fuel cell according to an exemplary embodiment of the present invention serves as a multiple perforation plate that is disposed between the separator 31 having a flat plate shape and a gas diffusion layer 20 to form flow paths for the reaction gas, and includes a porous hole region 110 having uneven shapes repeatedly formed therein and provided with a plurality of flow path holes 31a (see FIG. 5A) so as to allow the reaction gas to flow in a turbulent way and a channel region 120 forming a flow path so as to allow the reaction gas to flow along the flow direction of the reaction gas in a straight way.

At this time, the multiple perforation plate 100 is configured as an integrated body having the porous hole region 110 and the channel region 120, which are alternately disposed along a direction perpendicular to the flow direction of the reaction gas. In addition, the multiple perforation plate 100 is configured to allow the reaction gas to flow reciprocally between the porous hole region 110 and the channel region 120.

To be more specific, the multiple perforation plate 100 is formed by processing a plate-shaped metal material that is provided with a plurality of flow path holes 31a formed therein and a plurality of first communication holes 123 and second communication holes 124 to be described later. For example, in the plate-shaped metal material, the plurality of flow path holes 31a is formed by punching in a predetermined pattern in a region corresponding to the porous hole region 110, and the plurality of first communication holes 123 and second communication holes 124 is formed by punching in a predetermined pattern in a region corresponding to the channel region 120. In addition, the region corresponding to the porous hole region 110 is formed in a shape corresponding to a waveform along the flow direction of the reaction gas, and the region corresponding to the channel region 120 is formed by pressing the plate-shaped metal material, in which the plurality of flow path holes 31a, first communication holes 123, and second communication holes 124 are formed, in a method of using a mold formed in a protruding shape corresponding to the channel region 120, thereby manufacturing the multiple perforation plate 100. Obviously, the method of manufacturing the multiple perforation plate 100 is not limited to the method presented herein, and various methods for manufacturing the presented multiple perforation plate may be applicable.

Meanwhile, the porous hole region 110 is a region corresponding to a shape of the conventional general multiple perforation plate 32, and serves to maintain excellent diffusion ability of the reaction gas. To this end, the channel region 120 has an uneven shape by repeatedly forming waveform cross sections along the flow direction of the reaction gas, and is provided with the plurality of flow path holes 31a formed in various patterns, for example, a zigzag pattern, so as to allow the reaction gas to flow in a turbulent way. Accordingly, as shown in FIG. 4, the reaction gas, as a whole, flows from one side of the multiple perforation plate 100 to the other side thereof, and is diffused while flowing irregularly from side to side locally.

In addition, the channel region 120 is a region that serves to facilitate the discharge of the generated water, and is provided with a flow path having a straight shape.

For example, the channel region 120 includes a pair of side surface parts 121 and a contact surface part 122 formed between the pair of side surface parts 121 to contact the gas diffusion layer 20. Thus, the channel region 120 has an approximately "U"-shaped cross section. Thus, the contact surface part 122 is in contact with the gas diffusion layer 20, and is open in the direction of the separator 31.

Meanwhile, the side surface parts 121 forming the channel region 120 are integrally formed while extending from the adjacent porous hole region 110. At this time, each of the side surface parts 121 is provided with the plurality of first communication holes 123 communicating with the porous hole region 110, so that the reaction gas and the generated water may flow with each other in the porous hole region 110. Thus, as shown in FIG. 4, the reaction gas and the generated water flow with each other between the porous hole region 110 and the channel region 120 through the first communication holes 123.

In addition, in the contact surface part 122 forming the channel region 120, the plurality of second communication holes 124 communicating with the channel region 120 is formed, so that the reaction gas and the generated water may flow with each other in the gas diffusion layer 20. Thus, the reaction gas flows from the channel region to the gas diffusion layer 20 through the second communication holes 124. In addition, the generated water produced in the membrane electrode assembly 10 passes through the gas diffusion layer 20, and then flows into the channel region 120 through the second communication holes 124, and is then smoothly discharged through the channel region 120.

Meanwhile, it is preferable that the contact surface part 122 forming the channel region 120 is configured to be flat to make surface contact with the gas diffusion layer 20. Thus, the contact area between the multiple perforation plate wo and the gas diffusion layer 20 may be secured as a wide surface, and accordingly, contact resistance between the multiple perforation plate wo and the gas diffusion layer 20 may be reduced.

Next, a conventional general multiple perforation plate structure (of the comparative example) and a multiple perforation plate structure (of an exemplary embodiment) are compared by referring to the drawings.

Figure 5A:
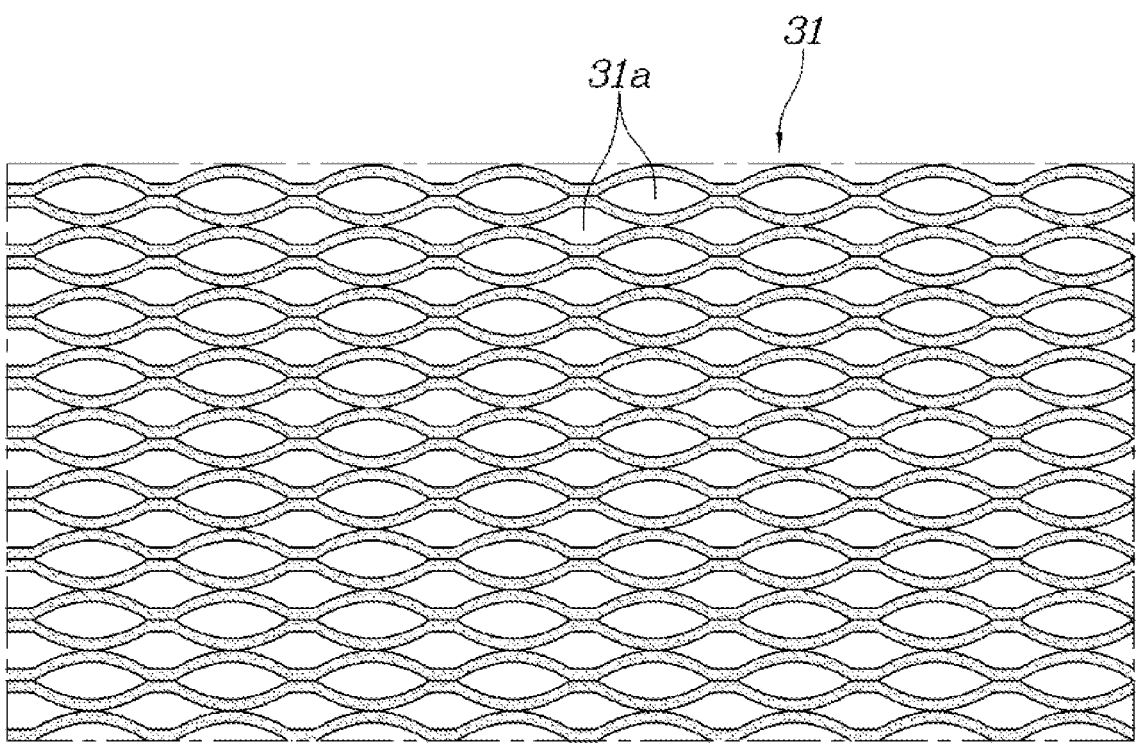
FIGS. 5A and 5B are planar pictures showing the multiple perforation plate according to comparative examples and an exemplary embodiment.
Figure 5B:
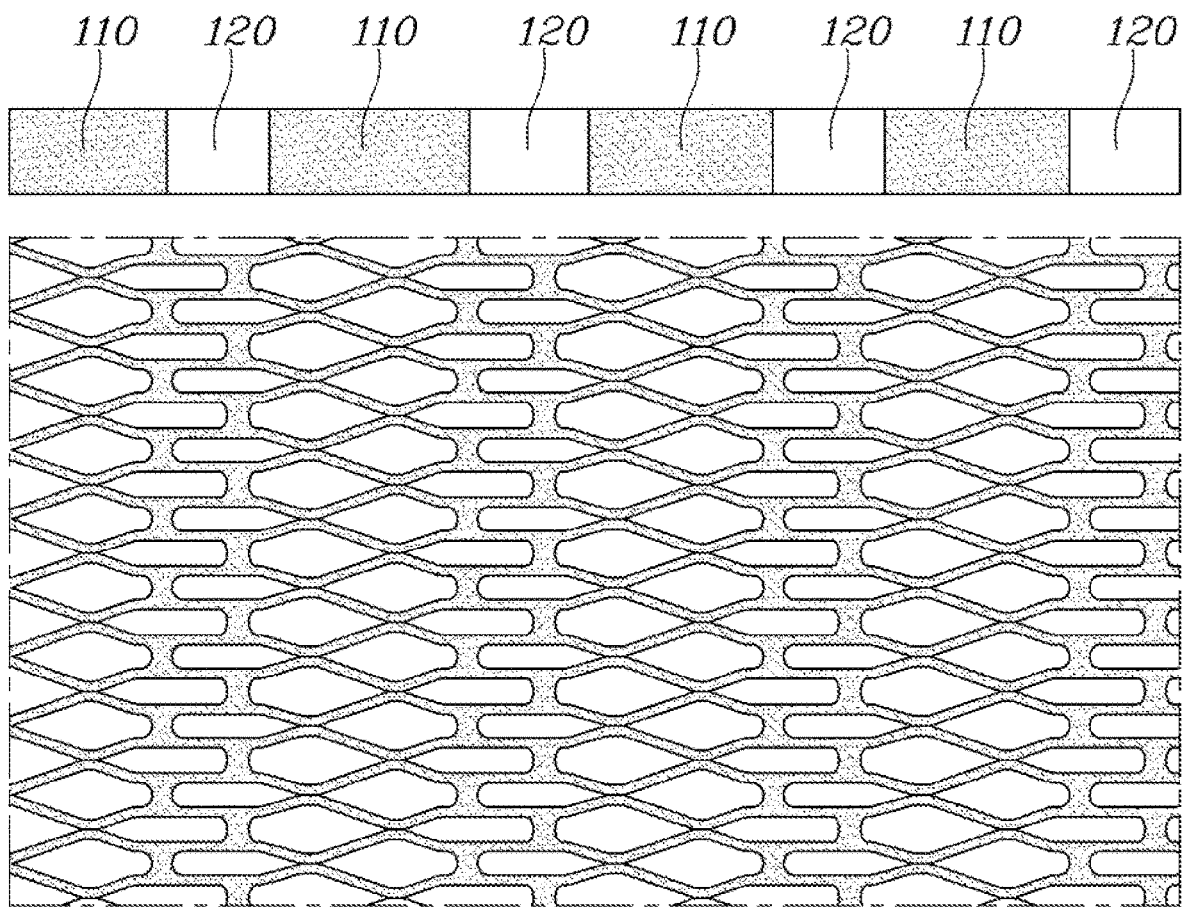
Figure 6A:
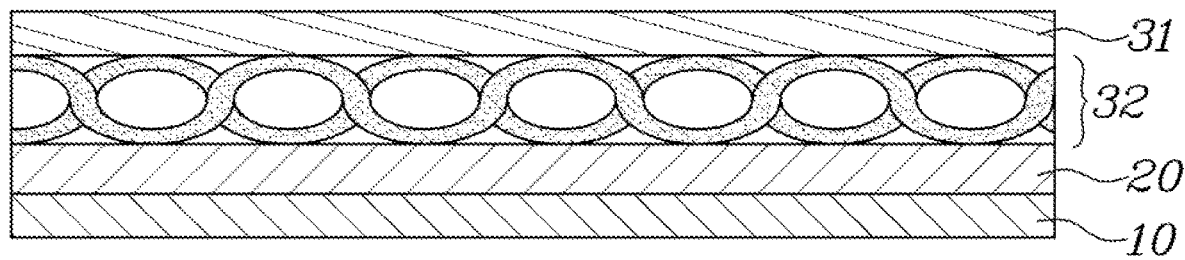
FIGS. 6A and 6B are front pictures showing the multiple perforation plate according to the comparative examples and an exemplary embodiment.
Figure 6B:
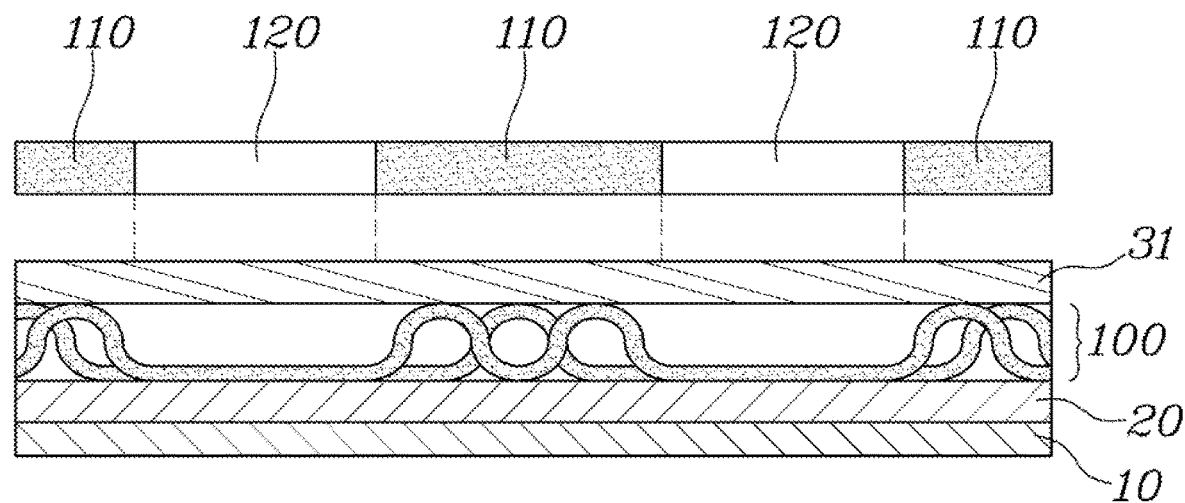

FIG. 5A is a planar picture showing the multiple perforation plate according to the comparative example, FIG. 5B is a planar picture showing the multiple perforation plate according to an exemplary embodiment, FIG. 6A is a front picture showing the multiple perforation plate according to the comparative example, and FIG. 6B is a front picture showing the multiple perforation plate according to the exemplary embodiment.

As can be seen in FIGS. 5A and 6A, in the comparative example, which is a conventional general porous structure, only the structure corresponding to the porous hole region of embodiments of the present invention is formed. Although the diffusion ability of the reaction gas may be secured accordingly, there may occur a problem in that the generated water may not be discharged smoothly, but stagnated.

In addition, as the multiple perforation plate 32 formed in an uneven structure and the gas diffusion layer 20 are in point contact or line contact, there may be a problem in that the contact resistance is increased in a specific area where the contact occurs.

Whereas, as can be seen in FIGS. 5B and 6B, in the exemplary embodiment of the multiple perforation plate structure according to the present invention, the porous hole region no and the channel region 120 are alternately formed and the flow paths having a straight shape are secured in the channel region 120, whereby the discharge ability of the generated water may be improved in the multiple perforation plate 100.

In addition, as the contact surface part 122 of the channel region 120 and the gas diffusion layer 20 are in surface contact, the contact area is increased, thereby obtaining an effect in that the contact resistance of the contacted area may be reduced.

Consequently, damage to the gas diffusion layer 20 may be prevented, and the carbon fibers forming the gas diffusion layer 20 may be prevented from separating, thereby preventing damage to the membrane electrode assembly 10 as well.

Although the present invention has been described with reference to the accompanying drawings and the above-described preferred exemplary embodiments, the present invention is not limited thereto, but is limited by the claims to be described later. Therefore, those skilled in the art can variously modify and revise the present invention without departing from the scope of the technical spirit of the claims to be described later.

What is claimed is:

1. A multiple perforation plate for a separator of a fuel cell, the multiple perforation plate designed to be disposed between the separator having a flat plate shape and a gas diffusion layer to form flow paths for a reaction gas, the multiple perforation plate comprising:
a porous hole region having an uneven shape repeatedly formed therein and provided with a plurality of flow path holes configured to allow the reaction gas to flow in a turbulent way; and
a channel region forming a flow path configured to allow the reaction gas to flow along a flow direction of the reaction gas in a straight way, wherein the porous hole region and the channel region are alternately disposed and integrally formed, wherein the channel region comprises a pair of side surface parts and a contact surface part formed between the pair of side surface parts to contact the gas diffusion layer and the channel region is open in a direction of the separator.

2. The multiple perforation plate of claim 1, wherein the reaction gas is configured to flow reciprocally between the porous hole region and the channel region.

3. The multiple perforation plate of claim 2, wherein each of the side surface parts is provided with a plurality of first communication holes configured to communicate with the porous hole region.

4. The multiple perforation plate of claim 2, wherein the contact surface part is provided with a plurality of second communication holes configured to communicate with the gas diffusion layer.

5. The multiple perforation plate of claim 2, wherein the contact surface part is flat and in surface contact with the gas diffusion layer.

6. The multiple perforation plate of claim 1, wherein each of the side surface parts is provided with a plurality of first communication holes configured to communicate with the porous hole region.

7. The multiple perforation plate of claim 1, wherein the contact surface part is provided with a plurality of second communication holes configured to communicate with the gas diffusion layer.

8. The multiple perforation plate of claim 1, wherein the contact surface part is flat and in surface contact with the gas diffusion layer.

9. A method of forming the porous hole region of the multiple perforation plate of claim 1, the method comprising:
processing a plate-shaped material provided with the plurality of flow path holes formed therein; and
repeatedly forming waveform cross sections along the flow direction of the reaction gas to form the uneven shape.

10. A fuel cell comprising:
a membrane electrode assembly comprising an electrolyte membrane and a pair of electrodes disposed on opposite sides of the electrolyte membrane;
a gas diffusion layer disposed on at least one side of the membrane electrode assembly;
a separator disposed outside the gas diffusion layer; and
a multiple perforation plate disposed between the separator and the gas diffusion layer, the multiple perforation plate comprising:
a porous hole region having an uneven shape repeatedly formed therein and provided with a plurality of flow path holes configured to allow a reaction gas to flow in a turbulent way; and
a channel region forming a flow path configured to allow the reaction gas to flow along a flow direction of the reaction gas in a straight way, wherein the porous hole region and the channel region are integrally formed and alternately disposed in the multiple perforation plate, wherein the channel region comprises a pair of side surface parts and a contact surface part formed between the pair of side surface parts to contact the gas diffusion layer and wherein the channel region is open in a direction of the separator.

11. The fuel cell of claim 10, wherein the separator has a flat plate shape.

12. The fuel cell of claim 10, wherein the porous hole region and the channel region are alternately disposed along a direction perpendicular to the flow direction of the reaction gas.

13. The fuel cell of claim 10, wherein the reaction gas is configured to flow reciprocally between the porous hole region and the channel region.

14. The fuel cell of claim 10, wherein each of the side surface parts is provided with a plurality of first communication holes configured to communicate with the porous hole region.

15. The fuel cell of claim 10, wherein the contact surface part is provided with a plurality of second communication holes configured to communicate with the gas diffusion layer.

16. The fuel cell of claim 10, wherein the contact surface part is flat and in surface contact with the gas diffusion layer.

17. A fuel cell comprising:
a membrane electrode assembly comprising an electrolyte membrane and a pair of electrodes disposed on opposite sides of the electrolyte membrane;
a gas diffusion layer disposed on at least one side of the membrane electrode assembly;
a separator disposed outside the gas diffusion layer; and
a multiple perforation plate disposed between the separator and the gas diffusion layer, the multiple perforation plate comprising:
a porous hole region having an uneven shape repeatedly formed therein and provided with a plurality of flow path holes configured to allow a reaction gas to flow in a turbulent way; and
a channel region forming a flow path configured to allow the reaction gas to flow along a flow direction of the reaction gas in a straight way, the channel region comprising:
a pair of side surface parts each provided with a plurality of first communication holes configured to communicate with the porous hole region; and
a contact surface part formed between the pair of side surface parts to contact the gas diffusion layer and provided with a plurality of second communication holes configured to communicate with the gas diffusion layer,
wherein the porous hole region and the channel region are integrally formed and alternately disposed in the multiple perforation plate.

18. The fuel cell of claim 17, wherein the channel region is open in a direction of the separator.

19. The fuel cell of claim 18, wherein the contact surface part is flat and in surface contact with the gas diffusion layer.

20. The fuel cell of claim 17, wherein the contact surface part is flat and in surface contact with the gas diffusion layer.

* * * * *